(12) United States Patent
Gretz et al.

(10) Patent No.: US 9,966,708 B1
(45) Date of Patent: May 8, 2018

(54) ELECTRICAL FITTING FOR SNAP CONNECTION OF ELECTRICAL CABLE TO A JUNCTION BOX

(71) Applicant: Arlington Industries, Inc., Scranton, PA (US)

(72) Inventors: Thomas J. Gretz, Delray Beach, FL (US); Daniel J. O'Neil, Moscow, PA (US)

(73) Assignee: ARLINGTON INDUSTRIES, INC., Scranton, PA (US)

( * ) Notice: Subject to any disclaimer, the term of this patent is extended or adjusted under 35 U.S.C. 154(b) by 0 days. days.

(21) Appl. No.: 15/648,567

(22) Filed: Jul. 13, 2017

Related U.S. Application Data

(60) Provisional application No. 62/512,288, filed on May 30, 2017.

(51) Int. Cl.
| | |
|---|---|
| *H01R 13/648* | (2006.01) |
| *H01R 13/74* | (2006.01) |
| *H01R 13/655* | (2006.01) |
| *H02G 3/06* | (2006.01) |

(52) U.S. Cl.
CPC ......... *H01R 13/745* (2013.01); *H01R 13/655* (2013.01); *H02G 3/0625* (2013.01)

(58) Field of Classification Search
CPC .. H01R 13/745; H01R 13/655; H01R 13/648; H01R 13/658; H01R 4/64; H02G 3/0625; G03G 5/0589; F16B 5/065
USPC .......................... 439/96, 460; 174/65 R, 661
See application file for complete search history.

(56) References Cited

U.S. PATENT DOCUMENTS

| | | | |
|---|---|---|---|
| 1,106,761 A * | 8/1914 | Weikert | H02G 3/0616 16/108 |
| 2,744,769 A | 5/1956 | Roeder et al. | |
| 3,858,151 A | 12/1974 | Paskert | |
| 4,012,578 A | 3/1977 | Moran et al. | |
| 4,156,103 A * | 5/1979 | Dola | H02G 3/0641 174/652 |
| 4,619,332 A * | 10/1986 | Sheehan | H02G 3/0691 174/659 |
| 4,621,166 A | 11/1986 | Neuroth | |
| 4,880,387 A | 11/1989 | Stikeleather et al. | |
| 4,990,721 A | 2/1991 | Sheehan | |
| 5,346,264 A * | 9/1994 | Law | F16L 25/0045 285/136.1 |
| 5,422,437 A | 6/1995 | Schnell | |
| D360,188 S | 7/1995 | Kiely et al. | |

(Continued)

*Primary Examiner* — Tulsidas C Patel
*Assistant Examiner* — Vladimir Imas

(57) ABSTRACT

A one-piece electrical fitting for connecting an electrical cable to a junction box, the electrical fitting including a tubular connector body including a leading end, a trailing end, a cap, an inner bore, and one or more grounding tangs and locking tangs. The grounding tangs include flanges and the locking tangs include free ends. A seat extends between the flanges of the grounding tangs and the free end of the locking tangs. One or more cable retaining tangs extend inward from the connector body into the inner bore. The electrical fitting is stamped and formed from a flat blank of metal. A tab and notch arrangement on the blank facilitates forming the blank into the tubular connector body. The fitting provides electrical continuity between the electrical cable, the fitting, and the junction box and stain relief to resist inadvertent removal of the electrical cable from the fitting.

10 Claims, 15 Drawing Sheets

(56) References Cited

U.S. PATENT DOCUMENTS

| | | | |
|---|---|---|---|
| 5,731,543 A * | 3/1998 | Jorgensen | H02G 3/0691 174/661 |
| D404,362 S | 1/1999 | Auray et al. | |
| 6,020,557 A | 2/2000 | Jorgensen | |
| 6,114,630 A * | 9/2000 | Gretz | H05K 13/00 174/51 |
| 6,335,488 B1 | 1/2002 | Gretz | |
| 6,380,483 B1 * | 4/2002 | Blake | H02G 3/0691 16/2.1 |
| 6,444,907 B1 * | 9/2002 | Kiely | H02G 3/0691 16/2.2 |
| 6,596,939 B1 | 7/2003 | Gretz | |
| 6,768,057 B2 * | 7/2004 | Blake | H02G 3/18 174/135 |
| 6,849,803 B1 * | 2/2005 | Gretz | H02G 3/0691 16/2.1 |
| 6,916,988 B1 * | 7/2005 | Auray | H02G 3/0691 174/665 |
| 7,060,900 B1 | 7/2006 | Gretz | |
| 7,075,007 B2 * | 7/2006 | Auray | F16L 5/00 174/656 |
| 7,476,817 B1 * | 1/2009 | Shemtov | H01R 13/5816 174/661 |
| 7,723,623 B2 * | 5/2010 | Kiely | F16L 5/00 174/650 |
| 7,824,213 B1 * | 11/2010 | Korcz | H01R 13/5816 174/64 |
| 7,952,034 B2 * | 5/2011 | Kiely | H02G 3/0683 174/650 |
| 8,119,933 B2 * | 2/2012 | Auray | F16L 5/00 174/650 |
| 8,143,535 B2 * | 3/2012 | Auray | F16L 5/00 174/650 |
| 8,350,163 B2 * | 1/2013 | Auray | H02G 3/0691 174/650 |
| 8,803,008 B2 * | 8/2014 | Chavan | H02G 3/0691 174/655 |
| 8,857,039 B2 * | 10/2014 | Sathyanarayana | H02G 3/0691 174/135 |
| 2005/0269122 A1 | 12/2005 | Pyron | |

* cited by examiner

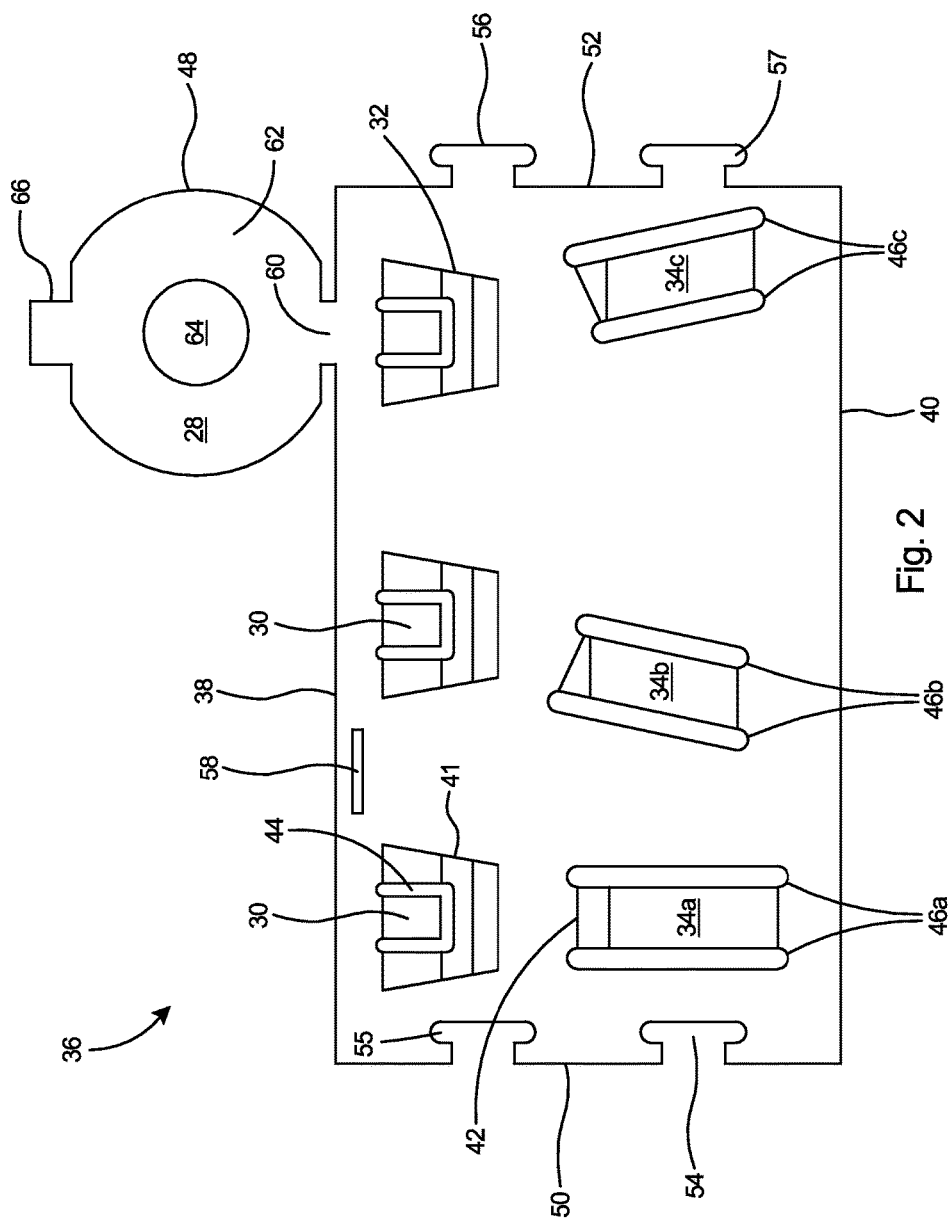

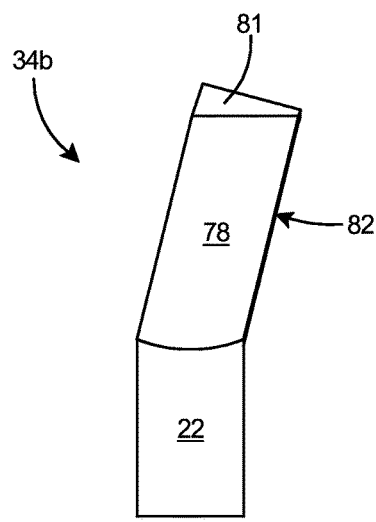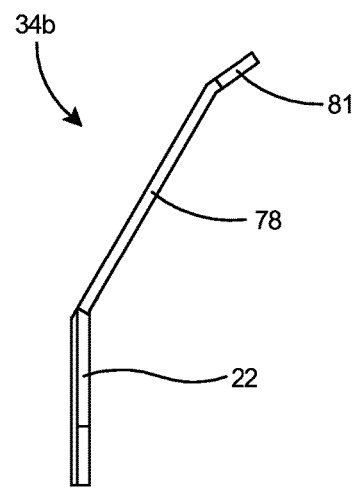
Fig. 8　　　　　Fig. 9
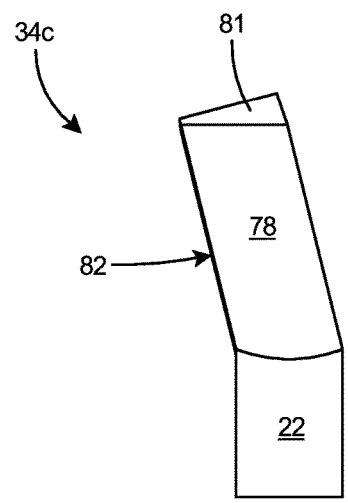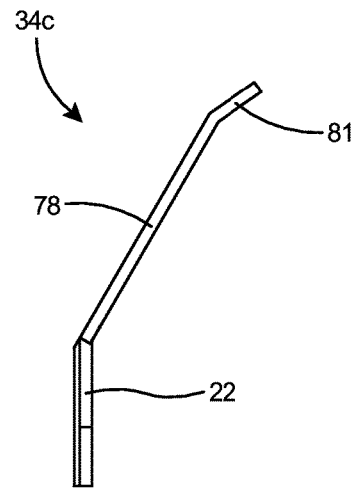
Fig. 10　　　　　Fig. 11

ELECTRICAL FITTING FOR SNAP CONNECTION OF ELECTRICAL CABLE TO A JUNCTION BOX

This application claims the priority of Provisional U.S. Patent Application Ser. No. 62/512,288 filed May 30, 2017.

FIELD OF THE INVENTION

This invention relates to electrical fittings or connectors for connecting electrical cables to a junction box and specifically to a one-piece electrical fitting for connecting an electrical cable to a junction box while establishing good electrical continuity between the electrical cable, the fitting, and the junction box.

BACKGROUND

Quick-connect electrical fittings are commonly used to rapidly connect an electrical cable to a knockout aperture in a junction box. Quick-connect electrical fittings typically are an assembly of parts including a connector body portion with two ends, a leading end portion on one end of the connector body for enabling insertion and attachment of the fitting assembly to a knockout aperture in a junction box, and a trailing end portion on the opposing end of the connector body for enabling attachment of an electrical cable to the fitting assembly.

Unfortunately, construction of the fitting assembly is a complex process that requires separately manufacturing the connector body, the leading end portion, and the trailing end portion, and subsequently assembling the portions to form the fitting assembly. The connector body portion is typically die-cast of metal and the separate end portions are typically stamped of sheet metal and formed into intricate shapes to perform their required functions. Die-casting is an expensive procedure that requires precision machinery, costly molds, and consumes a substantial amount of metal alloy for each part produced. Stamping and forming the leading and trailing end portions separately and then assembling them to the respective ends of the connector body also adds substantially to the unit cost of the fitting assembly.

Accordingly, what is needed is an electrical fitting that is simpler to produce and can be manufactured at a lower cost per unit. The electrical fitting must be capable of establishing and maintaining electrical continuity between the electrical cable, the fitting, and the junction box. Furthermore, the electrical fitting must be capable of providing strain relief to any attached cables, preventing easy removal by a rearward force applied to the fitting.

BRIEF SUMMARY OF THE INVENTION

The foregoing objectives are basically attained by a one-piece electrical fitting for connecting an electrical cable to a junction box, the electrical fitting including a tubular connector body including a leading end, a trailing end, a cap, and an inner bore. One or more grounding tangs and locking tangs extend outward from the connector body. The grounding tangs include flanges and the locking tangs include free ends. The outer surface of the grounding tangs include a seat extending between the flanges of the grounding tangs and the free end of the locking tangs. One or more cable retaining tangs extend inward from the connector body into the inner bore. The electrical fitting is stamped and formed from a flat blank of metal. Tabs on a first edge of the blank engage complementary slots on a second edge of the blank to lock the connector together when it is rolled into its tubular form. A cap on the leading end of the electrical fitting is held to the tubular connector body by a hinge and a tab that engages a slot in the connector body. The electrical fitting enables connection of an electrical cable to a junction box and establishes and maintains good continuity between the electrical cable, the fitting, and the junction box. The electrical fitting further provides proper stain relief to resist inadvertent removal of the electrical cable from the fitting.

OBJECTS AND ADVANTAGES

A first object of the invention is to provide an electrical fitting that can be produced at a substantially lower unit production cost.

A second object is to provide an electrical fitting that eliminates the need for assemblage of separate parts.

A further object of the current invention is to provide an electrical fitting that enables easy snap-in insertion of an electrical cable into a knockout of an electrical box, including easy snap-in insertion of an electrical cable at one end of the fitting and easy snap-in insertion into the knockout at an opposing end of the fitting.

A further object of the invention is to provide an electrical fitting of one-piece construction to lower unit production costs.

Another object of the invention is to provide an electrical fitting that eliminates the need to assemble separate parts.

A further object of the invention is to provide an electrical fitting that may be constructed without the use of a fastener.

A further object of the invention is to provide an electrical fitting in one piece that can be stamped and formed from sheet metal.

A further object of the invention is to provide an electrical fitting that, when operated, establishes and maintains good continuity between the electrical cable, the fitting, and the junction box.

A further object of the invention is to provide an electrical fitting that, when connected to a junction box, provides proper stain relief to resist inadvertent removal of the electrical cable from the fitting.

A further object of the invention is to provide an electrical fitting that does not require a split ring for connecting the fitting to the junction box.

A further object of the invention is to provide an electrical fitting that does not require a cable retaining ring or a clip for enabling attachment of an electrical cable to the fitting.

A further object of the invention is to provide a one-piece electrical fitting which, when operated, establishes electrical continuity between the electrical cable, the fitting, and the junction box while at the same time providing proper strain relief to the attached cable.

These and other objects and advantages of the present invention will be understood by reading the following description along with reference to the drawings.

BRIEF DESCRIPTION OF THE DRAWINGS

FIG. 2 is a plan view of a blank used to form the electrical fitting of FIG. 1.

FIG. 8 is a plan view of a second cable retaining tang that forms a portion of FIG. 1.

FIG. 9 is a side view of the second cable retaining tang.

FIG. 10 is a plan view of a third cable retaining tang that forms a portion of FIG. 1.

FIG. 11 is a side view of the third cable retaining tang.

DETAILED DESCRIPTION OF THE INVENTION

Figure 1:
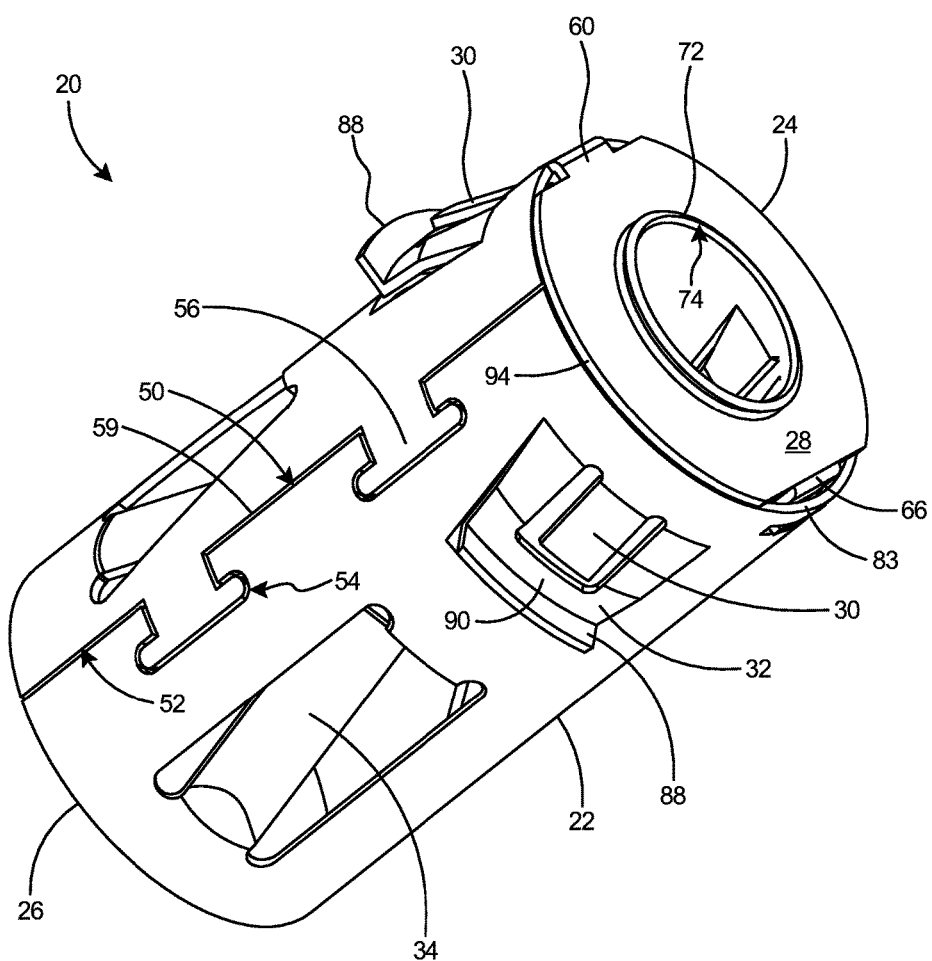
FIG. 1 is an isometric view of an electrical fitting according to the present invention.

With reference to FIG. 1, there is shown an electrical fitting 20 including a tubular connector body 22 having a leading end 24, a trailing end 26, a cap 28, a locking tang 30, a grounding tang 32, and a cable retaining tang 34. The term "leading end" refers to the forward end of the fitting, which will be snap fitted to a junction box. The term "trailing end" refers to the rearward end of the fitting, to which an electrical cable will be snap fitted.

Referring to FIG. 2, the electrical fitting is formed from a one-piece blank 36 that is preferably constructed of metal. The blank 36 is preferably formed into the shape shown in FIG. 2 from a flat metal blank and includes a leading end 38 and a trailing end 40. The overall shape and portions of the blank are removed, such as in a metal-stamping operation, to form various features in the eventual connector body, such as slits 41 that will define the grounding tangs 32, slits 42 that define the cable retaining tangs 34, and U-shaped slots 44 that will define the locking tangs 30. A series of paired parallel slots 46a, 46b, and 46c will define a plurality of cable retaining tangs 34a, 34b, and 34c.

A projection 48 from the leading end 38 will form the cap 28. The blank 36 includes a first edge 50 and a second edge 52. First edge 50 includes two T-shaped slots 54 and second edge includes two complementary T-shaped tabs 56 which will extend into the T-shaped slots when the blank is rolled into a cylindrical shape in a forming operation. T-shaped slots 54 include side channels 55 and T-shaped tabs 56 include side extensions 57. The blank 36 further includes a leading edge slot 58 that is substantially parallel with the leading end 38. As shown in FIG. 1, the two ends 50 and 52 of the fitting are in a flush fit along a longitudinal seam 59 on the connector body.

Preferably, paired parallel slots 46a are parallel with first edge 50 and second edge 52, paired parallel slots 46b are sloped toward the second edge 52, and paired parallel slots 46c are sloped away from the second edge 52. The projection 48 includes a hinge 60 extending from the leading end 38, a main body portion 62, an opening 64, and a tab 66.

Figure 4:
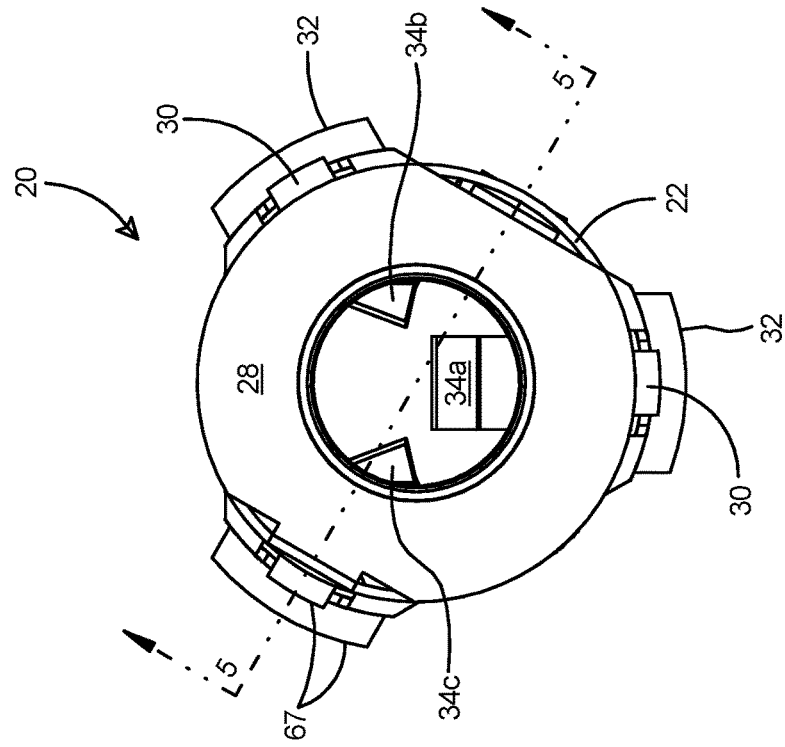
FIG. 4 is an end view of the electrical fitting from the leading end.
Figure 3:
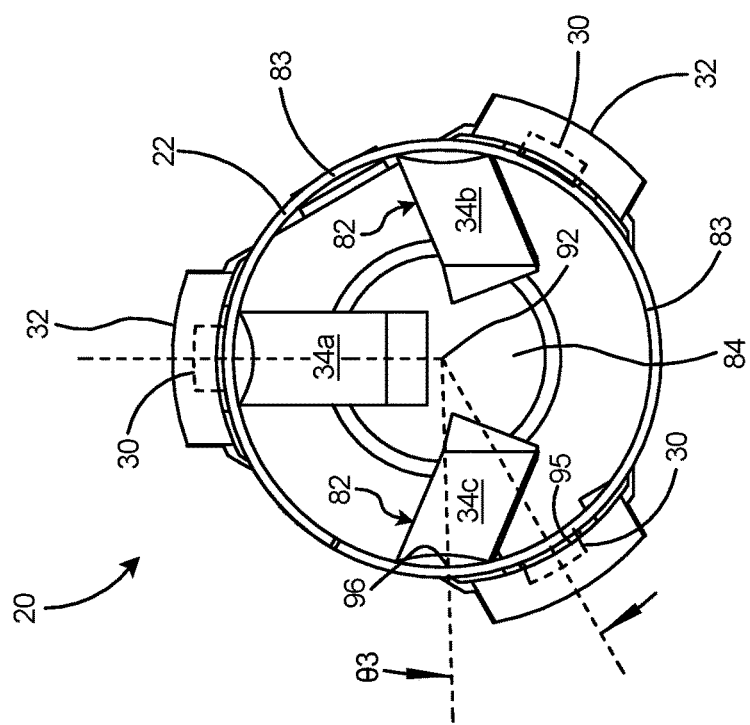
FIG. 3 is an end view of the electrical fitting from the trailing end.

With reference to FIGS. 3 and 4, after the blank is stamped out the tangs 30, 32, 34a, 34b, and 34c are bent out of the plane of the blank in the proper directions to form the electrical fitting. The blank is then rolled into a tubular shape to form the tubular connector body 22, with the cable retaining tangs 34a, 34b, and 34c extending inward of the tubular connector body and the locking tangs 30 and grounding tangs 32 extending outward of the tubular connector body 22. Laterally across the connector body, the outer ends 67 of locking tangs 30 and grounding tangs 32 are arcuate in shape as shown in FIG. 4.

Figure 5:
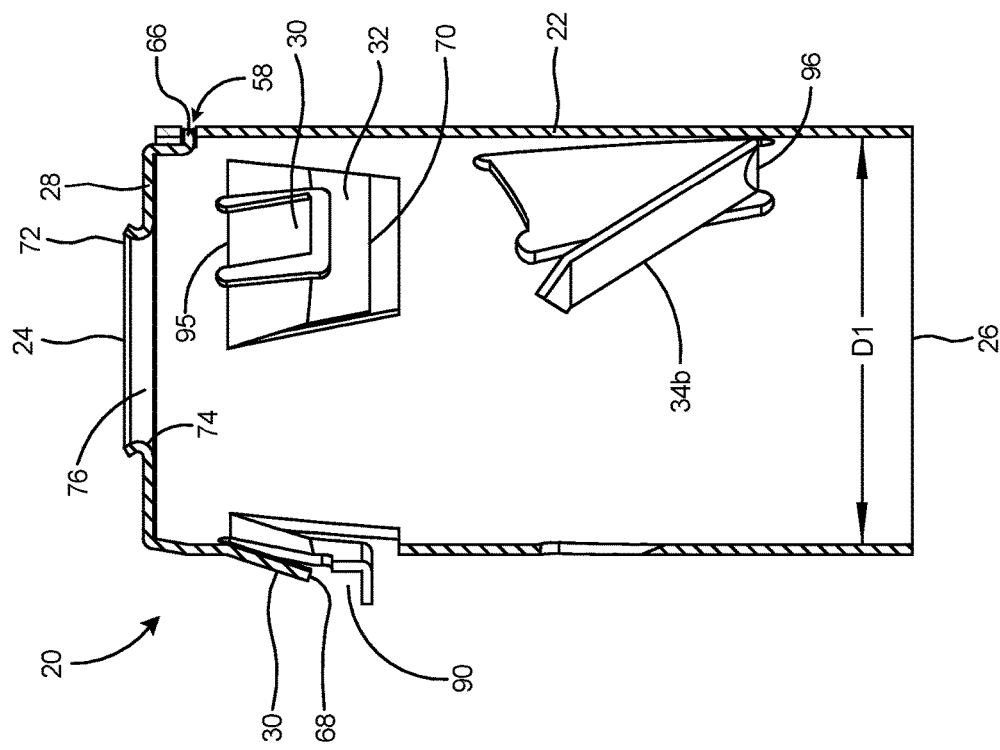
FIG. 5 is a sectional view of the electrical fitting taken along line 5-5 of FIG. 4.

With reference to FIG. 5, tab 66 of cap 28 extends into and engages leading edge slot 58 to hold the resultant tubular connector body together. The locking tangs 30 include free ends 68 that are flat in cross-section and oriented toward the trailing end 26 of the connector body 22. The grounding tangs 32 also are bent outward of the connector body, are oriented toward the trailing end 26 of the connector body 22, and include a second bend line 70. The cable retaining tangs, of which 34b is visible in FIG. 5, are oriented toward the leading end 24 of the connector body 22. The cap 28 includes a lip 72 that is rolled over to provide an arcuate shoulder 74 on its inner surface 76. Arcuate shoulder will provide a smooth surface for any electrical conductors (not shown) that are later inserted through the opening in the cap 28 to prevent cutting or abrasion of the insulating sheaths on the electrical conductors. The connector body 22 includes a constant diameter D1 from leading end 24 to trailing end 26 as shown in FIG. 5.

Referring to FIGS. 6-11, each cable retaining tang 34a, 34b, and 34c includes an arm 78 extending inward from the connector body 22 and an end portion 80, with the arm 78 at a first angle θ1 with respect to the connector body and the end portion 80 at a second angle θ2 with respect to the connector body 22.

Figure 6:
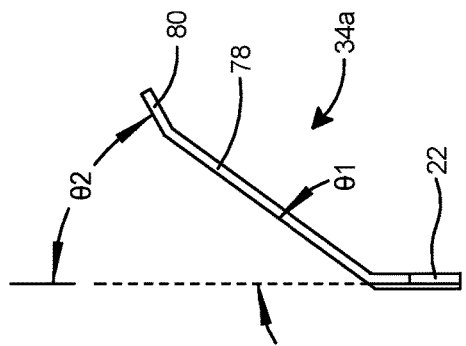
FIG. 6 is a plan view of a first cable retaining tang that forms a portion of FIG. 1.
Figure 7:
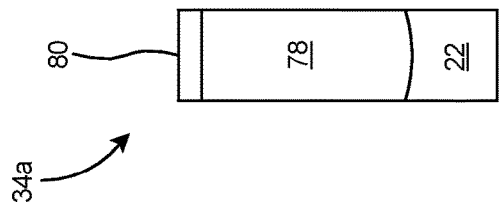
FIG. 7 is a side view of the first cable retaining tang.

As shown in FIG. 6, cable retaining tang 34a terminates in a flat end portion 80. As shown in FIGS. 8 and 10, cable retaining tangs 34b and 34c respectively, terminate in an angled end portion 81. The arms 78 of cable retaining tangs 34b and 34c are canted in opposing directions with respect to tang 34a (see FIG. 3) and each include a major side 82. The cable retaining tangs 34a, 34b, and 34c will direct an electrical cable (not shown) inserted into the electrical fitting 20 toward the open area 84 at the center of the fitting 20 in FIG. 3 and will securely engage and hold the cable between the cable retaining tangs 34a, 34b, and 34c and the wall 83 of the connector body.

Figure 13:
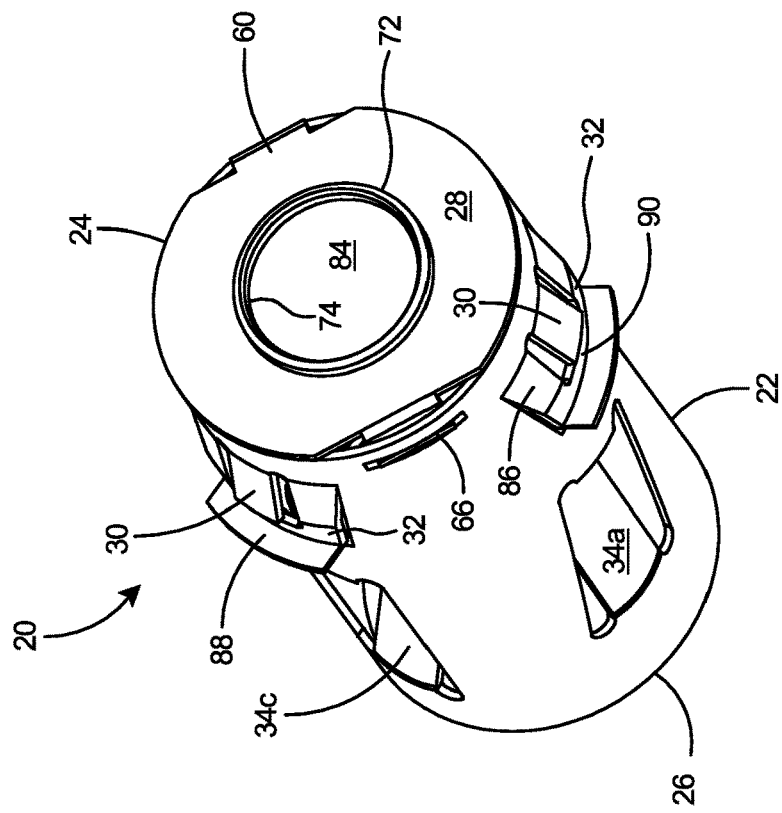
FIG. 13 is an isometric view of the electrical fitting as viewed from the leading end.
Figure 12:
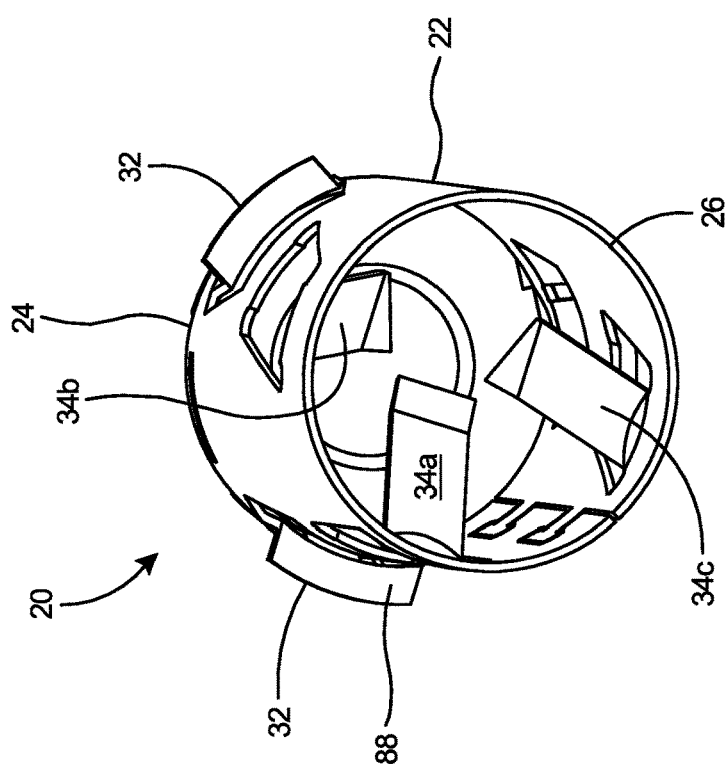
FIG. 12 is an isometric view of the electrical fitting as viewed from the trailing end.

With reference to FIG. 12, there are preferably three cable retaining tangs 34a, 34b, and 34c in the first embodiment of the electrical fitting 20. As shown in FIG. 13, there are preferably three locking tangs 30 and three grounding tangs 32, of which two of each are in view in FIG. 13, in the first embodiment of the electrical fitting 20.

Figure 14:
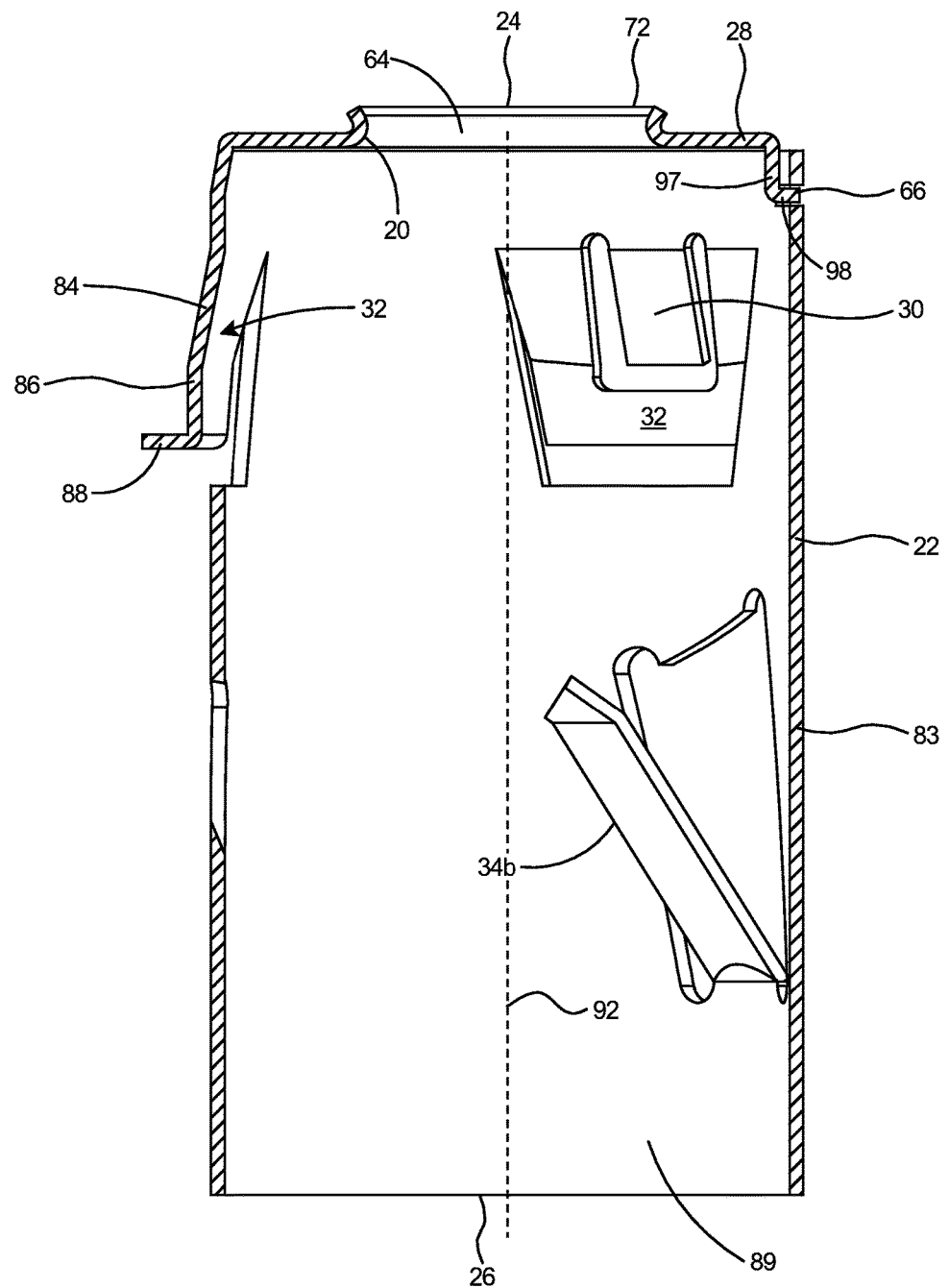
FIG. 14 is a sectional view of the electrical fitting taken along line 5-5 of FIG. 4 with the locking tang and window deleted to show the grounding tang.

With reference to FIG. 5, the locking tang 30 is bent at one angle from the connector body 22 whereas, as shown in FIG. 14, the grounding tang 32 includes a base 84 that is bent at a first angle from the connector body 22 and an end portion 86 bent at a second angle from the base 84. The grounding tang 32 further includes a flange 88 extending outward from the end portion 86 of the grounding flange 88. Flange 88 is substantially perpendicular to the connector body wall 83. In operation, when electrical fitting 20 is inserted within a junction box (not shown), flange 88 will function to stop the forward travel of electrical fitting 20 into the junction box. Connector body 22 includes an inner bore 89.

As shown in FIG. 13, the locking tang 30 extends from the interior of the base 86 of the grounding tang 32. A seat 90 is formed between the end of each locking tang 30 and the flange 88 of each grounding tang 32. When electrical fitting 20 is inserted within a junction box, locking tangs 30 will depress and snap outwards after the wall of the junction box has cleared the locking tangs. When pressing the electrical fitting within a knockout aperture, the locking tangs 30 will flex inward until the locking tangs have cleared the junction box wall, after which the locking tangs will snap outward to their unbiased positions. Flange 88 will stop forward travel of the electrical fitting into the junction box. Locking tangs 30 and flanges 88 of grounding tangs 32 will then retain the junction box walls within the seat 90. The one-piece metal construction of the electrical fitting, and the pressure exerted by the resilient locking tangs and the grounding tangs will provide good electrical continuity or grounding between the fitting 20 and the junction box. Likewise, the one-piece metal construction of the electrical fitting, and the pressure exerted by the cable retaining tangs 34a, 34b, and 34c, will provide good electrical continuity or grounding between the fitting 20 and the inserted electrical cable. Furthermore, the locking tangs 30 will hold the fitting 20 firmly to the junction box and the cable retaining tangs 34a, 34b, and 34c will hold an electrical cable securely to the fitting and junction box, thereby providing strain relief to the inserted cable.

Referring to FIG. 14, connector body 22 is preferably of constant thickness and bore 89 is preferably of constant diameter from leading end 24 to trailing end 26. Opening 64 in cap 28 is substantially coaxial with center axis 92 of connector body 22. Tab 66 of cap 28 includes a first leg 97 extending substantially perpendicular from the cap 28 and a second leg 98 that is substantially parallel to the cap.

Most preferably, as shown in FIG. 1, the blank that forms the connector body 22 is rolled into a complete cylindrical shape with no gap between the two ends 50 and 52 of the blank 36. Thus the electrical fitting 20 is not a compressible fitting and avoids the inclusion of a split ring on the leading edge as used in conventional quick connect fittings. The cap 28 includes an outer periphery 94 that is preferably of larger diameter than the outside diameter of the wall 83 of the connector body, therefore a substantial portion of cap 28 overlaps the connector body wall 83.

Figure 15:
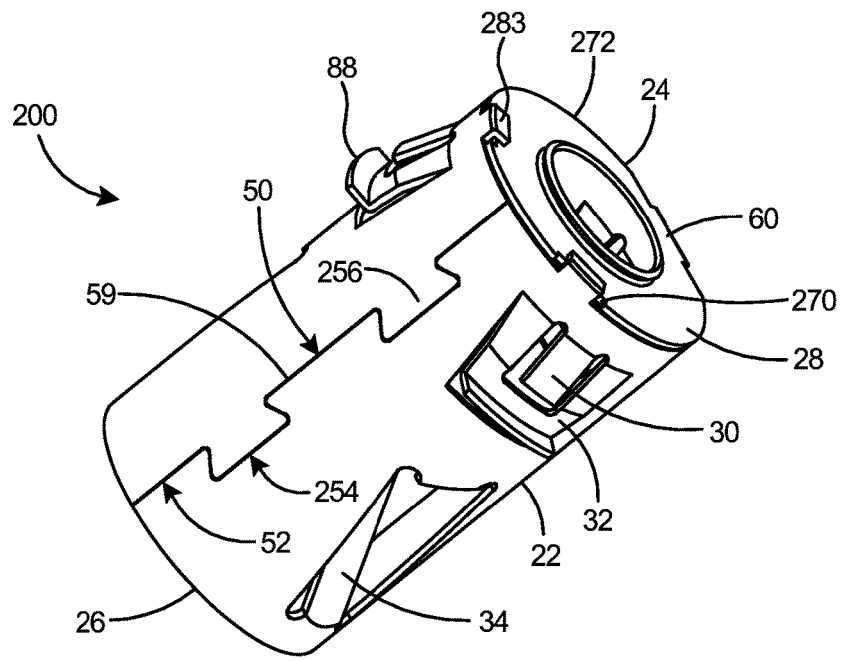
FIG. 15 is an isometric view of a second and preferred embodiment of an electrical fitting according to the present invention.
Figure 16:
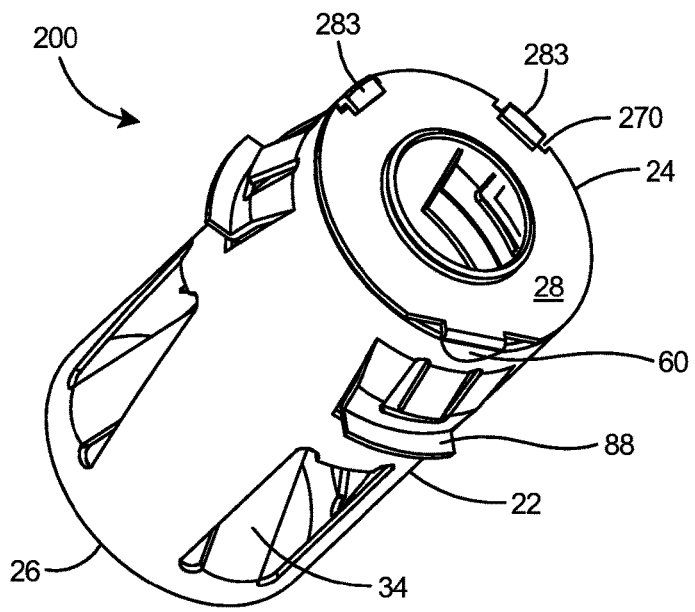
FIG. 16 is an isometric view of the electrical fitting of FIG. 15.

With reference to FIG. 3, locking tang 30 includes a base 95 at its connection to the wall 83 and each of the cable retaining tangs include a base 96 at their respective connections to the wall 83. Referring to FIG. 3, with respect to the end of the connector body preferably at least one locking tang 30, such as the locking tang 30 shown in dashed lines in the lower left quadrant of FIG. 3, is offset angularly by angle θ3 from the cable retaining tang 34c. Thus at least one locking tang 30 is not in longitudinal alignment with a cable retaining tang 34b along the connector body 22. The locking tang 30 is offset radially from the cable retaining tang 34 with respect to the axial center 92 of the connector body Referring to FIGS. 15 and 16, the second and preferred embodiment of the electrical fitting 200, similar to the first embodiment, includes a one-piece cylindrical body 22, a longitudinal seam 59 at the joinder of two ends 50 and 52 of the body, and a cap 28. The two ends 50 and 52 of the body 22 are locked together by a dovetail tab 256 on the first edge 50 and a dovetail groove 254 on the second edge 52. The two ends 50 and 52 are joined in a flush fit, with no gap between the two ends of the body. Cap 28 includes a hinge 60 and two notches 270 on its other periphery 272. Two tabs 283 on the connector body 22 are bent over the cap 28 at the notches 270 to lock the cap to the connector body.

Figure 28:
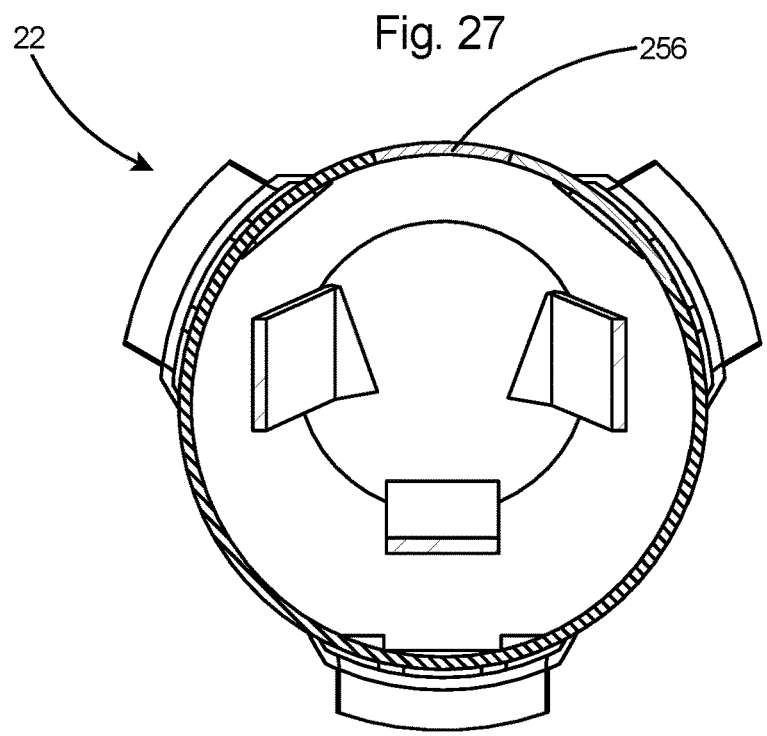
FIG. 28 is a sectional view of a portion of the connector body taken along line 28-28 of FIG. 27.
Figure 29:
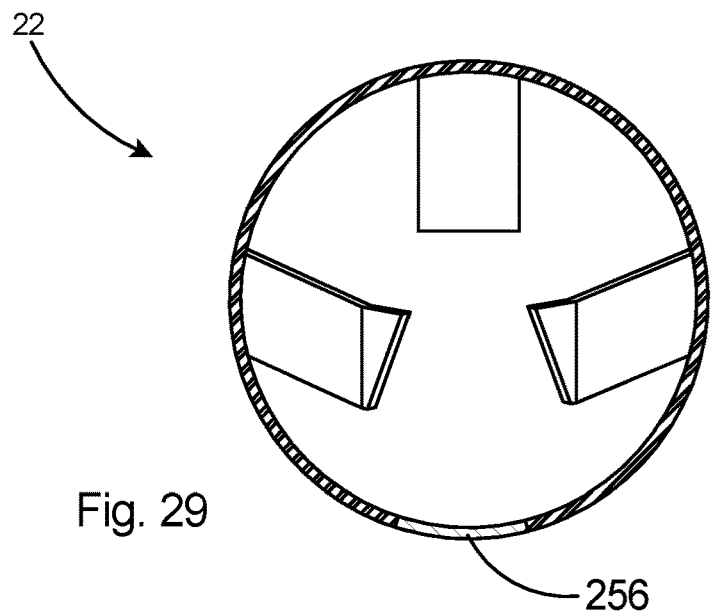
FIG. 29 is a sectional view of a portion of the connector body taken along line 29-29 of FIG. 27.
Figure 30:
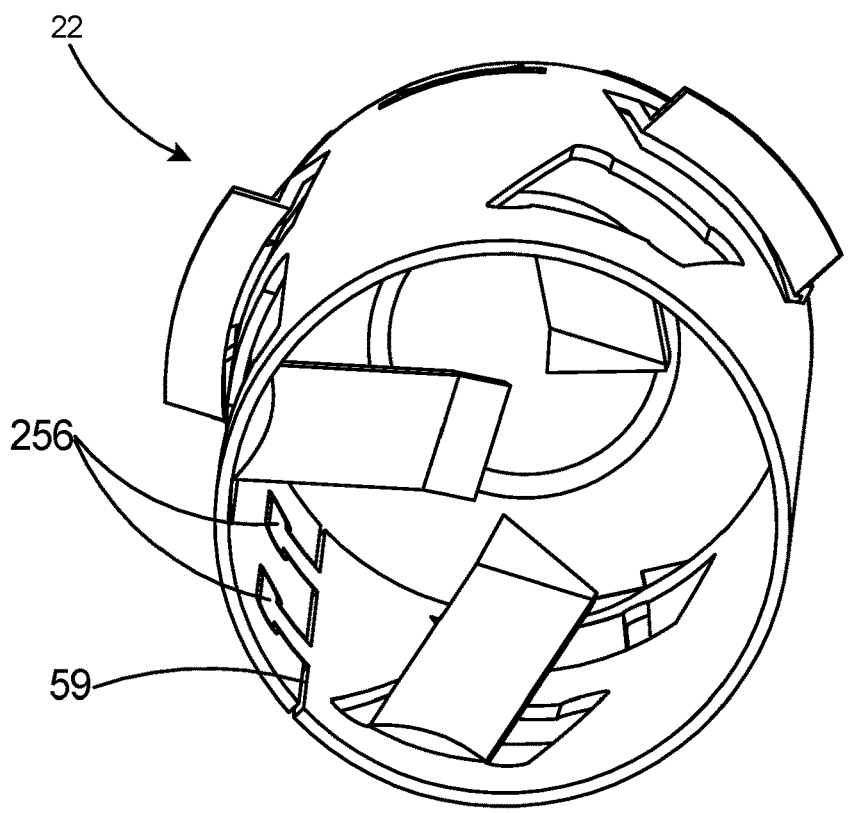
FIG. 30 is an isometric view, as viewed from the trailing end, of the connector body that forms a portion of the electrical fitting of FIG. 1.

With reference to FIGS. 28-29, the tabs 256 at the longitudinal seam 59 match the radius of the cylindrical connector body 22 and the tabs 256 are flush with the outer surface (see FIG. 15) and flush with the inner surface (see FIG. 30) of the connector body 22.

Figure 17:
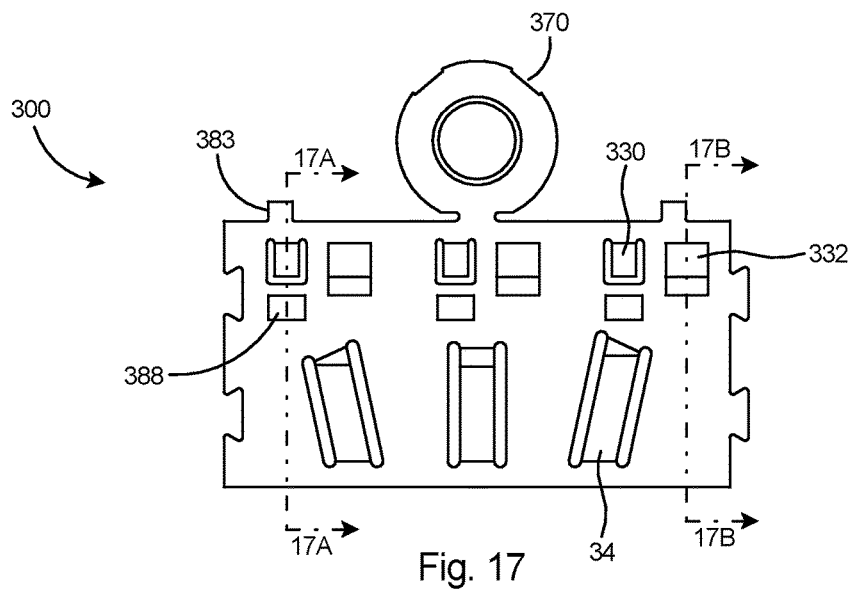
FIG. 17 is a plan view of a blank used to form a third embodiment of an electrical fitting according to the present invention.
Figures 17A, 17B, 18:
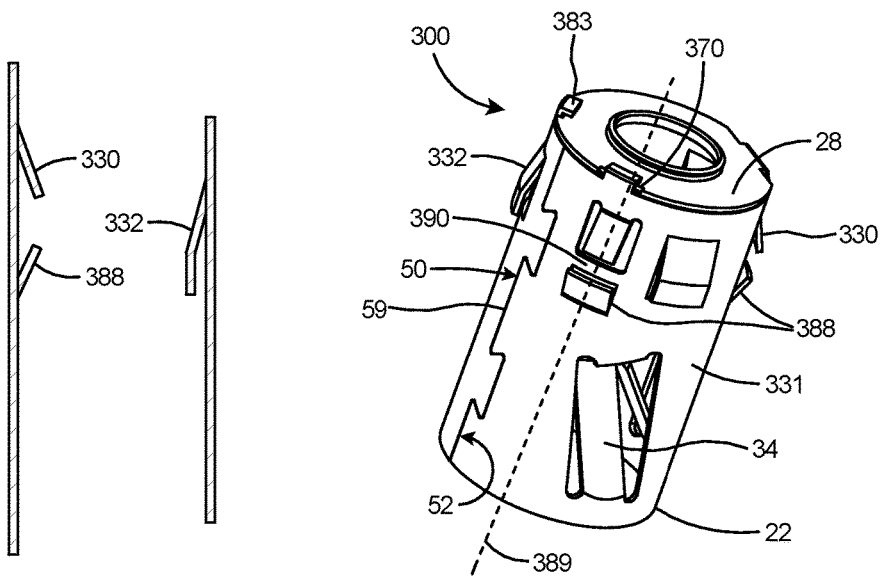
FIG. 17A is a sectional view of the blank taken along line 17A-17A of FIG. 17.
FIG. 17B is a sectional view of the blank taken along line 17B-17B of FIG. 17.
FIG. 18 is an isometric view of a third embodiment of an electrical fitting, the fitting formed from the blank of FIG. 17.

With reference to FIGS. 17-18, the third embodiment of an electrical fitting 300 includes a one-piece substantially cylindrical body 22, a longitudinal seam 59 at the joinder of two ends 50 and 52 of the body, and a cap 28. In this embodiment the locking tangs 330 are separate from the grounding tangs 332 and are spaced apart on the outer circumference 331 of the body 22. One or more flanges 388 are separate from the grounding tang 332. Flanges 388 are spaced around the outer circumference of the tubular connector body 22. Each flange 388 is aligned longitudinally along the connector body 22 with a corresponding locking tang 330. A seat 390 is included on the outer circumference of the connector body 22 between each locking tang 330 and its longitudinally aligned flange 388. Two tabs 383 on the connector body 22 are bent over the cap 28 at the notches 370 to lock the cap to the connector body. The tabs 383 do not extend beyond the outer circumference 331 of the connector body 22.

Figure 19:
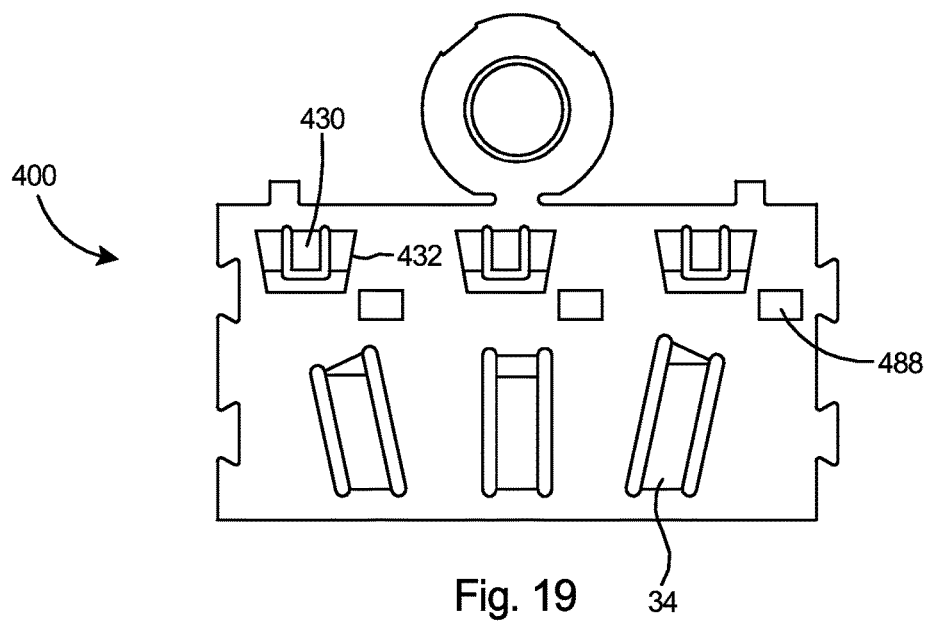
FIG. 19 is a plan view of a blank used to form a fourth embodiment of an electrical fitting according to the present invention.
Figure 20:
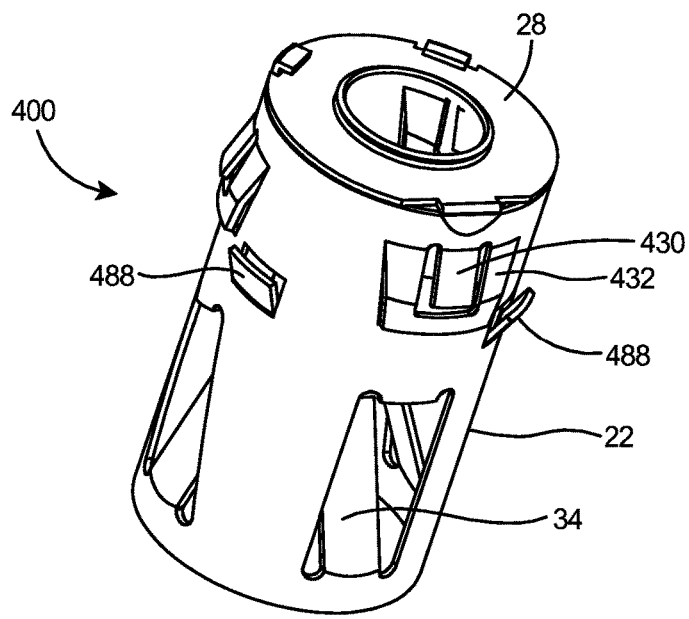
FIG. 20 is an isometric view of a fourth embodiment of the electrical fitting, the fitting formed from the blank of FIG. 19.

Referring to FIGS. 19 and 20, the fourth embodiment of the electrical fitting 400 includes combination locking and grounding tangs, with the locking tangs 430 extending from the interior of the grounding tang 432. Flanges 488 extend from the connector body. Flanges 488 are not aligned longitudinally with along the connector body 22 but are offset from the locking tangs 430 around the circumference of the connector body 22. When the electrical fitting 400 is installed in a knockout in an electrical box, the flanges 488 will stop the insertion of the connector body into the knockout.

Figure 21:
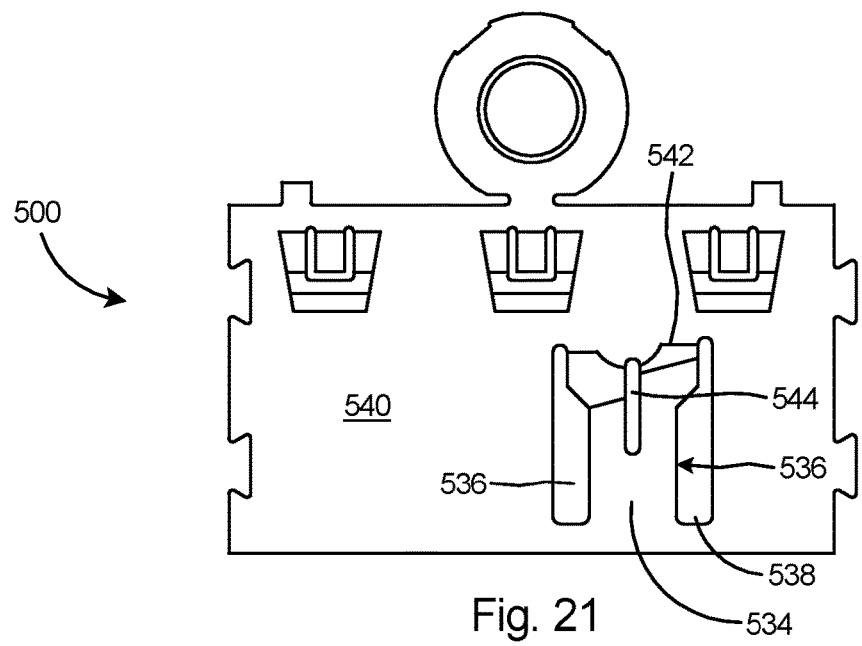
FIG. 21 is a plan view of a blank used to form a fifth embodiment of an electrical fitting according to the present invention.
Figure 22:
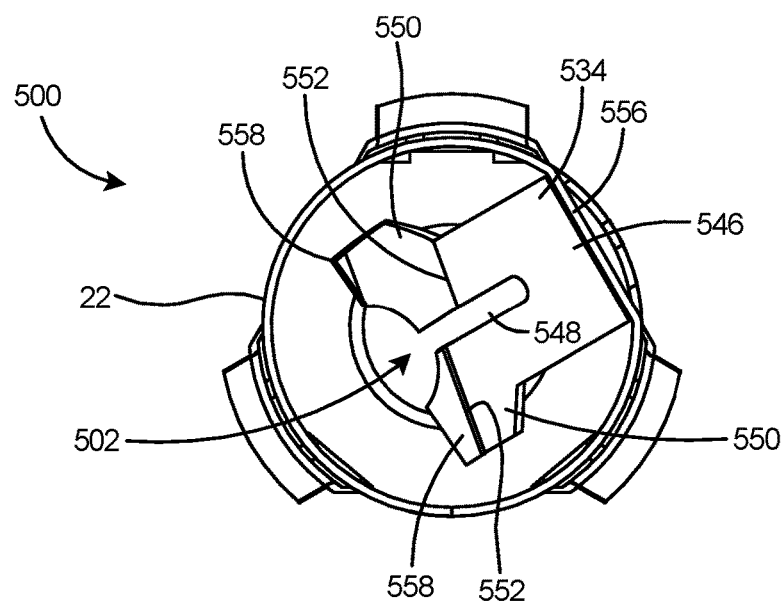
FIG. 22 is an end view from the trailing end of a fifth embodiment of the electrical fitting, the fitting formed from the blank of FIG. 21.

With reference to FIGS. 21-22, a fifth embodiment of the electrical fitting 500 includes a cable retaining arrangement 502 that includes a single cable retaining tang 534 bent inward from the connector body 22. As shown in FIG. 21, the cable retaining tang 534 includes two sides 536 formed by two long slots 538 in the blank 540 and a bifurcated end 542 formed by a slit 544 in the blank. As shown in FIG. 22, the cable retaining tang 534 includes a base 546, a slot 548 dividing the cable retaining tang into two arms 550 and a bend line 552 and on each arm 550. Cable retaining tang 534 extends from a flat wall portion 556 of the connector body 22. The bend lines for each arm 550 are offset at different distances from the flat wall portion 556. Each arm 550 of the cable retaining tang 534 includes an end portion 558.

Figure 23:
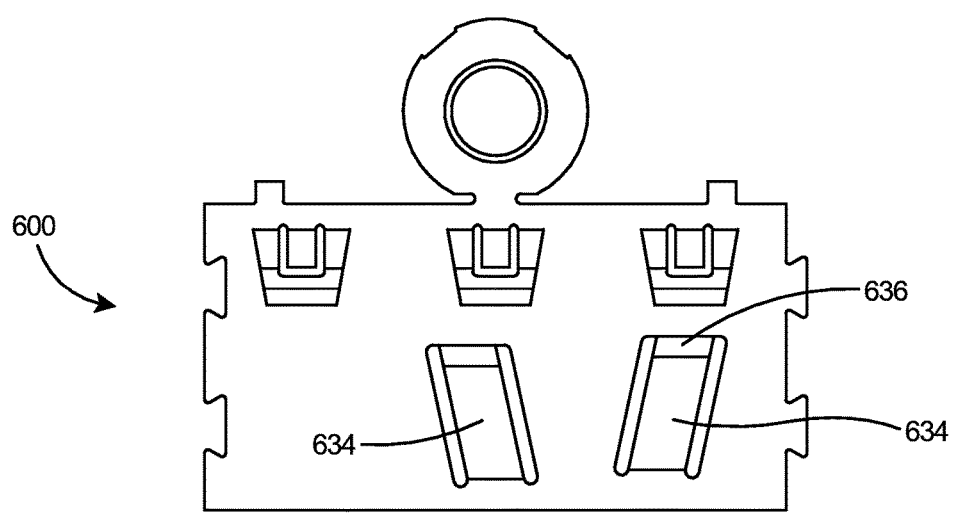
FIG. 23 is a plan view of a blank used to form a sixth embodiment of an electrical fitting according to the present invention.
Figure 24:
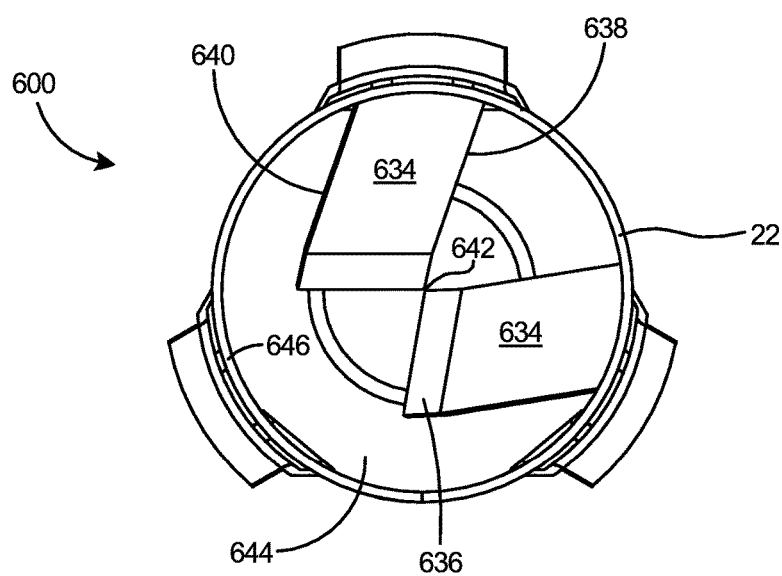
FIG. 24 is an end view from the trailing end of a sixth embodiment of the electrical fitting, the fitting formed from the blank of FIG. 23.

Referring to FIGS. 23 and 24, the sixth embodiment of the electrical fitting 600 includes two cable retaining tangs 634. The cable retaining tangs 634 each extend inward from the connector body 22 to an end portion 636. Cable retaining tangs 634 include an outer side 638 and an inner side 640. The inner sides 638 terminate in a point 642. The points 642 of the cable retaining tangs 634 engage one another in the inner bore 644 of the connector body 22. When electrical fitting 600 is connected to a junction box (not shown) and an electrical cable is inserted into the trailing end of the fitting, the cable retaining tangs 634 will force the inserted cable against the far wall 646 of the connector body 22 and thus effect good electrical continuity or grounding of the electrical cable to the fitting and of the fitting to the junction box.

Figure 25:
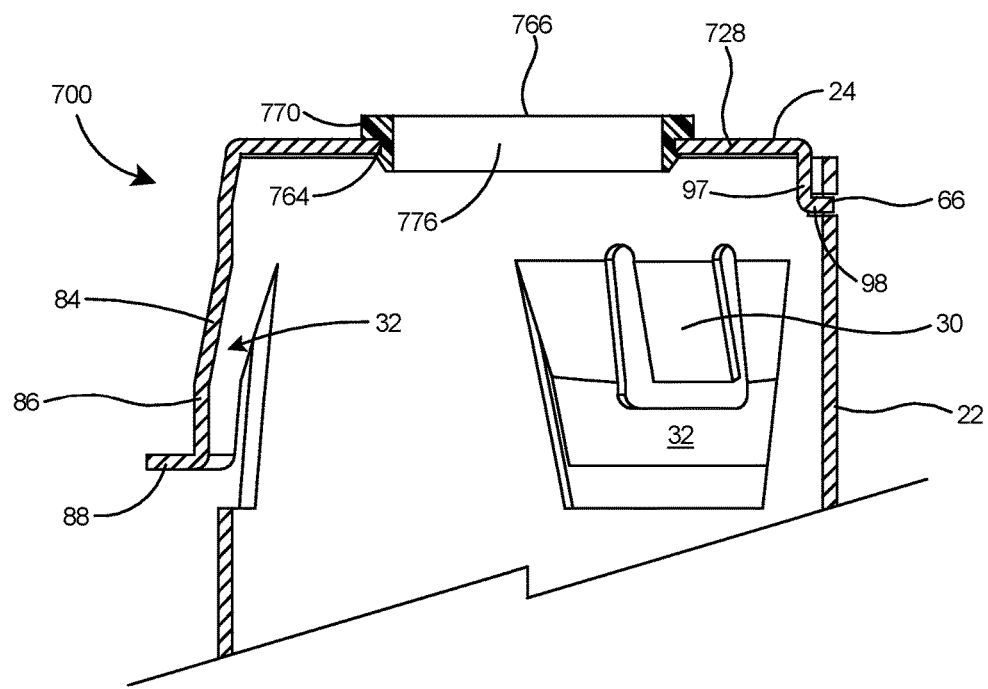
FIG. 25 is a sectional view of the leading end of a further embodiment of an electrical fitting according to the present invention.
Figure 26:
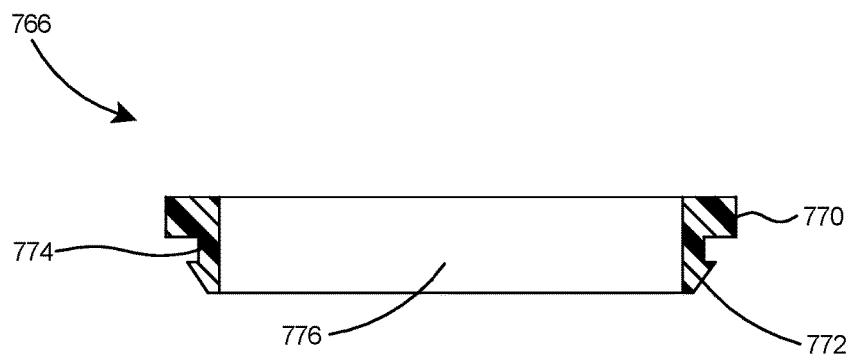
FIG. 26 is a sectional view of a tubular insert that forms a portion of the electrical fitting depicted in FIG. 25.
Figure 27:
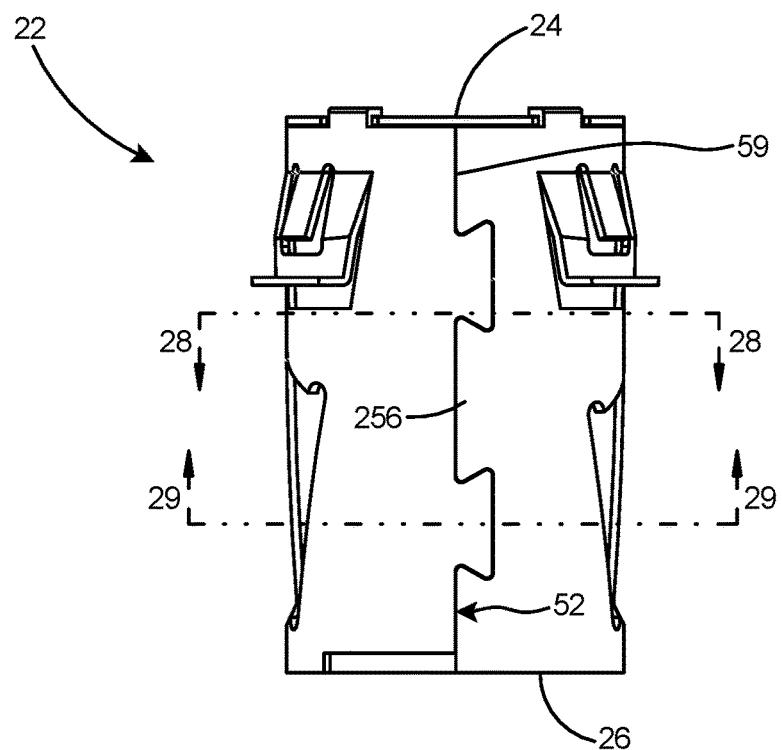
FIG. 27 is a side view of the electrical fitting of FIG. 15.

With reference to FIGS. 25 and 26, a further embodiment of the electrical fitting 700 includes a cap 728 with an opening 764. A tubular insert 766 is inserted into the opening 764 and functions to provide a smooth, non-abrasive surface to protect the insulation of any conductors that are later inserted through the fitting and through the opening into a junction box (not shown). Tubular insert 766 includes a leading flange 770 and a trailing flange 772 defining a recess 774 for accommodating the cap 728. Tubular insert 766, which further includes a throat 776, is preferably constructed of plastic. As shown in FIG. 25, when seated on the cap 728 within the opening 764 of the electrical fitting 700, throat 776 provides a smooth, non-abrasive surface thereby preventing abrasion of any conductors inserted through the cap.

The electrical fitting offers advantages over prior art connectors in that, as a result of its one-piece construction, it is easy to manufacture and may be manufactured at a lower unit cost. As described hereinabove, the electrical fitting may be stamped from a flat piece of metal, such as steel, and formed into a tubular shape, with the various tangs bent outward or inward of the tubular connector body as required and the cap bent over to form the leading end of the fitting.

Several types of electrical cable and conduit can be connected to a junction box with the electrical fitting 20 described herein, including MC/HCF steel or aluminum cable, AC/HCF steel or aluminum cable, flexible metal conduit steel and aluminum, including both regular and reduced wall thickness, and MC cable continuous corrugated aluminum.

Although the description above contains many specific descriptions, materials, and dimensions, these should not be construed as limiting the scope of the invention but as merely providing illustrations of some of the embodiments of this invention. Thus the scope of the invention should be determined by the appended claims and their legal equivalents, rather than by the examples given.

What is claimed is:

1. An electrical fitting, comprising:
a one-piece fitting including a tubular connector body having a leading end, a trailing end, a wall, and a bore;
a grounding tang extending outward from said connector body;
a locking tang extending outward from said grounding tang;
a cable retaining tang extending inward of said connector body into said bore;
a cap on said leading end of said connector body;
an outer periphery and an opening in said cap;
a lip including a rolled over portion of said cap at said opening,
a hinge extending from said connector body to said cap;
a notch on said cap on an opposing side of said cap from said hinge; and
a tab extending from said connector body and folded over the cap at the notch.

2. The electrical fitting of claim 1, further comprising:
a flange on said grounding tang; and
said flange of said grounding tang is perpendicular to said wall of said connector body.

3. An electrical fitting, comprising:
a tubular one-piece connector body including a wall, a leading end, a trailing end, and a bore;
a grounding tang extending outward from said connector body;
a locking tang extending outward from said grounding tang;
a cable retaining tang extending inward of said connector body into said bore;
a first edge and a second edge on said connector body, said first edge and said second edge including a tab and slot arrangement for locking said edges of said connector body into the tubular shape, said tab and slot arrangement having a tab on said first edge and a slot on said second edge, said tab including an inner surface and an outer surface;
said tab and slot arrangement including a side extension on said tab and a side channel on said slot;
said first edge and said second edge in a flush fit forming a longitudinal seam along said connector body; and
said tab of said tab and slot arrangement matching the radius of curvature of said connector body.

4. The electrical fitting of claim 3, further comprising:
a flange on said grounding tang; and
said flange of said grounding tang is perpendicular to said wall of said connector body.

5. The electrical fitting of claim 4, further comprising:
a cap on said leading end of said connector body; and
a forwardly-outturned lip on said cap.

6. The electrical fitting of claim 3, further comprising said grounding tang is wider than said locking tang.

7. The electrical fitting of claim 4, further comprising:
a free end on said locking tang;
said flange and said grounding tang are in longitudinal alignment along said connector body; and
a seat between said flange of said grounding tang and said free end of said locking tang.

8. The electrical fitting of claim 7, wherein said free end of said locking tang is flat.

9. An electrical fitting, comprising:
a tubular non compressible one-piece connector body including a diameter, a leading end, a trailing end, a linear longitudinal seam including two longitudinal edges, and a bore;
a grounding tang extending outward from said connector body;
a locking tang extending outward from said grounding tang, said locking tang including an arcuate free end;
a cable retaining tang extending inward of said connector body into said bore;
a cap at said leading end;
a forwardly-outturned lip on said cap;
said arcuate free end of said locking tang is of greater diameter than the diameter of said connector body;
a first edge and a second edge on said connector body;
a tab extending from said first edge and a slot in said second edge of said connector body; and
said tab of said connector body matching the radius of curvature of the connector body with the inner surface of said tab flush with the inner surface of said connector body and the outer surface of said tab flush with the outer surface of said connector body.

10. The electrical fitting of claim 9, further comprising:
an axial center on said connector body; and
said locking tang is offset radially from said cable retaining tang with respect to the axial center of said connector body.

* * * * *